(12) United States Patent
Woodland et al.

(10) Patent No.: US 10,437,077 B2
(45) Date of Patent: Oct. 8, 2019

(54) METHOD OF OPTIMIZING GEOMETRY OF A SEMI-FINISHED OPHTHALMIC LENS IN A SET OF SEMI-FINISHED OPHTHALMIC LENSES

(71) Applicants: CARL ZEISS VISION INC., San Diego, CA (US); CARL ZEISS VISION INTERNATIONAL GMBH, Aalen (DE)

(72) Inventors: Andrew Woodland, Woodcroft (AU); Jonathan Deeds, Monument, CO (US)

(73) Assignees: CARL ZEISS VISION INC., San Diego, CA (US); CARL ZEISS VISION INTERNATIONAL GMBH, Aalen (DE)

( * ) Notice: Subject to any disclaimer, the term of this patent is extended or adjusted under 35 U.S.C. 154(b) by 164 days.

(21) Appl. No.: 15/128,767

(22) PCT Filed: Mar. 24, 2014

(86) PCT No.: PCT/US2014/031560
§ 371 (c)(1),
(2) Date: Sep. 23, 2016

(87) PCT Pub. No.: WO2015/147777
PCT Pub. Date: Oct. 1, 2015

(65) Prior Publication Data
US 2017/0108709 A1    Apr. 20, 2017

(51) Int. Cl.
*G02C 7/02*    (2006.01)

(52) U.S. Cl.
CPC ............. *G02C 7/028* (2013.01); *G02C 7/02* (2013.01); *G02C 7/027* (2013.01); *G02C 2202/08* (2013.01)

(58) Field of Classification Search
CPC ........ G02C 7/024; G02C 7/025; G02C 7/027; G02C 7/028; G02C 2202/22
(Continued)

(56) References Cited

U.S. PATENT DOCUMENTS 8,241,534 B2    8/2012    Akiyama
8,295,961 B2    10/2012   Daimaru et al.
(Continued)

FOREIGN PATENT DOCUMENTS

CN    1921980 A    2/2007
EP    1 967 894 A1    9/2008
(Continued)

OTHER PUBLICATIONS

International Search Report and Written Opinion issued by the International Search Authority dated Mar. 24, 2017 in corresponding PCT Application No. PCT/US2014/031560 (11 pages).
(Continued)

*Primary Examiner* — Robert E. Tallman
(74) *Attorney, Agent, or Firm* — Buchanan Ingersoll & Rooney PC (57) ABSTRACT

The present invention provides a method, a system, and a computer program code for optimizing geometry of at least one semi-finished ophthalmic lens in a set of semi-finished ophthalmic lenses having a designated lens material, each of the semi-finished ophthalmic lenses in the set having an initially determined geometry including one of a plurality of base curves determined to allow manufacture of finished ophthalmic lenses for ophthalmic lens prescriptions.

15 Claims, 6 Drawing Sheets

(58) Field of Classification Search
USPC .................... 359/519.73, 159.74, 159.77
See application file for complete search history.

(56) References Cited

U.S. PATENT DOCUMENTS

| | | |
|---|---|---|
| 2004/0046287 A1 | 3/2004 | Andino et al. |
| 2006/0050235 A1 | 3/2006 | Meron et al. |
| 2006/0055876 A1 | 3/2006 | Hall et al. |
| 2009/0168015 A1 | 7/2009 | Wooley et al. |
| 2009/0222122 A1 | 9/2009 | Daimaru et al. |
| 2011/0153287 A1 | 6/2011 | Potze et al. |
| 2014/0347626 A1* | 11/2014 | Sahler ............... G02C 7/02 351/159.73 |

FOREIGN PATENT DOCUMENTS

| | | | |
|---|---|---|---|
| EP | 1 552 336 A1 | 10/2008 | |
| JP | 2000-089174 A | 3/2000 | |
| JP | 2008310202 A | 12/2008 | |
| JP | 5043683 B2 | 7/2012 | |
| JP | 5043683 B2 | 10/2012 | |
| WO | WO 2001/011990 A1 | 2/2004 | |
| WO | 2005084885 A1 | 9/2005 | |
| WO | 2013/072249 A1 | 5/2013 | |

OTHER PUBLICATIONS

Office Action dated Feb. 7, 2017, issued by the Korean Intellectual Property Office in corresponding Korean Patent Application No. 10-2016-7026199. (4 pages).

Office Action dated Dec. 27, 2016, issued by the National Office of Intellectual Property for Socialist Republic of Vietnam in corresponding Vietnamese Patent Application No. 1-2016-03473. (2 pages, Partial English Translation).

English translation of Office Action (Decision of Rejection) dated Jul. 18, 2017, issued by the Japanese Patent Office in the corresponding Japanese Patent Application No. 2016-548271. (4 pages).

Extended European Search Report dated Sep. 28, 2017, issued by the European Patent Office in corresponding European Application No. 14887136.1. (7 pages).

Office Action (Notice of Reasons for Rejection) dated Oct. 24, 2017, by the Korean Patent Office in corresponding Korean Patent Application No. 10-2017-7024386 and English translation of the Office Action. (6 pages).

English translation of Office Action (First Office Action) dated Jan. 19, 2018, by the State Intellectual Property Office, P.R. China in corresponding Chinese Patent Application No. 201480077451.3. (10 pages).

English translation of Office Action (Examination Report) dated Mar. 26, 2018, by the Intellectual Property India in corresponding Indian Patent Application No. 20167026527. (6 pages).

International Search Report (PCT/ISA/210) dated Dec. 9, 2014, by the Korean Patent Office as the International Searching Authority for International Application No. PCT/US2014/031560.

Written Opinion (PCT/ISA/237) dated Dec. 9, 2014, by the Korean Patent Office as the International Searching Authority for International Application No. PCT/US2014/031560.

Office Acton issued by the Japanese Patent Office dated Mar. 28, 2017 in corresponding Japanese Application No. 2016-548271 with partial English language translation (12 pages).

Office Action dated Mar. 15, 2019, by the Mexican Institute of Industrial Property in corresponding Mexican Application No. MX/a/2016/012132. (15 pages).

Office Action dated Oct. 2, 2018, by the Mexican Institute of Industrial Property in corresponding Mexican Application No. MX/a/2016/012132. (41 pages).

\* cited by examiner

| Base Curve | Puck # | Diameter (mm) | Front Curve Radius (mm) | Centre Thickness (mm) | Edge Thickness (mm) | Back Curve (D) | Back Curve Radius (mm) | % Usage | Material Savings vs Current (%) | % Global Usage |
|---|---|---|---|---|---|---|---|---|---|---|
| 050 | 1 | 73 | 1271.87 | 8.7 | 16.1 | 6.0 | 87.9 | 100.0% | -3.7% | 2% |
| 130 | 1 | 73 | 583.60 | 5.4 | 11.1 | 6.0 | 87.9 | 96.7% | 28.5% | 3% |
|  | 2 | 73 | 583.60 | 8.4 | 16.1 | 6.0 | 88.0 | 3.3% |  |  |
| 190 | 1 | 73 | 351.98 | 6.1 | 8.0 | 3.0 | 176.7 | 91.0% | 38.9% | 4% |
|  | 2 | 73 | 351.98 | 10.1 | 16.1 | 6.0 | 87.9 | 9.0% |  |  |
| 240 | 1 | 69 | 280.99 | 4.5 | 8.0 | 3.0 | 176.7 | 44.4% | 27.8% | 12% |
|  | 2 | 73 | 280.99 | 5.3 | 10.7 | 6.0 | 87.9 | 51.6% |  |  |
|  | 3 | 73 | 280.99 | 10.7 | 16.1 | 6.0 | 87.9 | 4.1% |  |  |
| 340 | 1 | 73 | 184.28 | 4.5 | 6.2 | 4.0 | 132.5 | 53.8% | 35.1% | 22% |
|  | 2 | 73 | 184.28 | 6.3 | 8.0 | 4.0 | 132.5 | 39.7% |  |  |
|  | 3 | 73 | 184.28 | 7.6 | 11.1 | 6.0 | 87.9 | 6.5% |  |  |
| 460 | 1 | 69 | 138.75 | 5.2 | 4.2 | 3.0 | 176.7 | 55.1% | 42.8% | 10% |
|  | 2 | 73 | 138.75 | 6.1 | 5.0 | 3.0 | 176.7 | 36.7% |  |  |
|  | 3 | 73 | 138.75 | 9.1 | 11.1 | 6.0 | 87.9 | 8.2% |  |  |
| 560 | 1 | 69 | 116.11 | 5.2 | 3.4 | 3.0 | 176.7 | 65.8% | 38.0% | 7% |
|  | 2 | 73 | 116.11 | 4.5 | 3.8 | 4.0 | 132.5 | 24.0% |  |  |
|  | 3 | 73 | 116.11 | 7.0 | 6.2 | 4.0 | 132.5 | 10.2% |  |  |
| 640 | 1 | 69 | 104.46 | 4.7 | 3.4 | 4.0 | 132.5 | 64.3% | 44.3% | 10% |
|  | 2 | 73 | 104.46 | 5.1 | 5.0 | 5.0 | 106.0 | 33.7% |  |  |
|  | 3 | 73 | 104.46 | 5.5 | 3.4 | 5.0 | 106.0 | 2.0% |  |  |
| 690 | 1 | 69 | 98.66 | 4.6 | 4.2 | 5.0 | 106.0 | 46.1% | 31.2% | 12% |
|  | 2 | 73 | 98.66 | 6.6 | 3.4 | 3.0 | 176.7 | 36.0% |  |  |
|  | 3 | 73 | 98.66 | 8.1 | 6.2 | 4.0 | 132.5 | 17.9% |  |  |
| 790 | 1 | 69 | 87.09 | 5.5 | 4.2 | 5.0 | 106.0 | 73.1% | 39.2% | 7% |
|  | 2 | 73 | 87.09 | 6.5 | 5.0 | 5.0 | 106.0 | 23.7% |  |  |
|  | 3 | 73 | 87.09 | 8.5 | 8.0 | 5.0 | 106.0 | 3.2% |  |  |
| 850 | 1 | 69 | 77.69 | 6.0 | 3.4 | 4.0 | 132.5 | 54.0% | 39.6% | 7% |
|  | 2 | 73 | 77.69 | 7.6 | 5.0 | 5.0 | 106.0 | 39.8% |  |  |
|  | 3 | 73 | 77.69 | 10.8 | 6.8 | 4.0 | 132.5 | 6.1% |  |  |
| 950 | 1 | 69 | 69.48 | 7.1 | 5.0 | 6.0 | 87.9 | 76.5% | 30.1% | 9% |
|  | 2 | 73 | 69.48 | 10.1 | 5.6 | 4.0 | 132.5 | 23.5% |  |  |
| 1080 | 1 | 73 | 61.39 | 12.5 | 5.6 | 4.0 | 132.5 | 100.0% | 1.8% | 1% |

METHOD OF OPTIMIZING GEOMETRY OF A SEMI-FINISHED OPHTHALMIC LENS IN A SET OF SEMI-FINISHED OPHTHALMIC LENSES

TECHNICAL FIELD

The present invention relates to a method and system for optimising geometry of at least one semi-finished ophthalmic lens in a set of semi-finished ophthalmic lenses having a designated lens material.

BACKGROUND OF INVENTION

Generally, ophthalmic lenses have two opposing refracting surfaces and are worn adjacent the eye in a spectacle frame to assist the function of the eye. In one existing method of manufacturing ophthalmic lenses for a lens wearer, semi-finished ophthalmic lenses are first produced with a finished surface on one side only by a lens manufacturer. The surface on the other side of the semi-finished ophthalmic lens is subsequently finished by, for instance, further grinding and polishing to fit a lens wearer's prescription at a prescription (Rx) laboratory and form finished ophthalmic lenses. It will be appreciated by a person skilled in the art that the lens wearer's ophthalmic prescription (Rx script) is a formula determined by an examiner to correct anomalies in a lens wearer's sight, usually including sphere, cylinder, addition and prism powers as well as decentration.

With respect to the above described existing semi-finished ophthalmic lenses, in an example, an Rx laboratory receives prescription data of a lens wearer (e.g. sphere, cylinder, addition and prism power data) from an examiner and selects one of a set of semi-finished ophthalmic lenses for further grinding and polishing to produce a lens that fits the lens wearer's prescription. The set of semi-finished ophthalmic lenses is made from a designated lens material with a designated refractive index (e.g. 1.67) and each of the lenses has a determined geometry including one of a plurality of base curves determined to allow manufacture of the finished ophthalmic lenses for substantially all ophthalmic lens prescriptions. The base curves, on semi-finished ophthalmic lenses, provide surface power for the first side curve (e.g. front) which, when combined with the second side curve (e.g. back, facing a wearer's eye), after it is ground and polished, produces the desired lens power. It will be appreciated by those persons skilled in the art that the first and/or second side curves can be spherical, aspherical and/or progressive surfaces. It will also be appreciated that the determined geometries of the lenses in the set differ with different designated refractive indexes; for example, lenses with a refractive index of 1.67 are thinner than those with a refractive index of 1.6. It will also be appreciated that a base curve is a surface power of the finished surface of a semi-finished lens which, when combined with the eventually finished other surface of the lens, forms the desired lens power. Thus, for example, a lens manufacturer produces a set of, say, thirteen semi-finished ophthalmic lenses—each of the lenses having different base curves—for Rx laboratories to form finished lenses for substantially all possible prescriptions. Accordingly, each of the semi-finished lenses in the set—sometimes called blanks or pucks in the art, particularly for "Freeform" usage—must be able to satisfy a subset of wearer and/or frame data to produce suitable finished lenses. "Freeform" refers to a lens manufacturing process that can create most curve configurations from a semi-finished ophthalmic lens by cutting the semi-finished ophthalmic lens in a specified manner. It will be appreciated by a person skilled in the art that the "Freeform" process is more sophisticated than traditional lens manufacturing processes and, for example, employs a cutting point controlled by a CNC machine to cut a lens rather than traditionally grinding the lens. As a result, the "Freeform" process is able to produce much more complex surfaces that include, but not limited to, sphere, cylinder and addition powers combined together. It will be appreciated that the complexity of a lens surface relates to its manufacturing difficulty.

As described, the geometries of each of the lenses in the existing exemplary set of semi-finished ophthalmic lenses are determined to allow for an extensive range of ophthalmic lens prescriptions to be assigned to each base curve produced (e.g. usually not exceed 6 Dioptres of Cylinder). It will be appreciated that the geometry of a lens includes its diameter and thickness. Thus, each lens in the set is designed to have a geometry that is large enough in thickness and diameter to allow for manufacture of substantially all prescriptions that are assigned to each of the base curves. Accordingly, thick and large diameter semi-finished lenses are produced to suit all prescriptions and frame sizes which include some rare prescriptions that lie far outside the norm for common prescriptions. Accordingly, for common prescriptions that do not require such a thick and large semi-finished lens, there is significant lens material wastage. It will be appreciated that extreme outlier Rx scripts—clinical rarities—are manufactured as special cases using very large bespoke puck components, and are not considered part of the "standard range population"; that is, substantially all ophthalmic lens prescriptions.

It is therefore an aim of the present invention to provide a method of optimising geometry of at least one semi-finished ophthalmic lens in a set of semi-finished ophthalmic lenses to, for instance, minimise lens material wastage.

Before turning to a summary of the present invention, it will be appreciated that the discussion of the background to the invention is included to explain the context of the invention. This is not to be taken as an admission that any of the material referred to was published, known or part of the common general knowledge in Australia or in any other country.

SUMMARY OF INVENTION

The present invention provides a method of optimising geometry of at least one semi-finished ophthalmic lens in a set of semi-finished ophthalmic lenses having a designated lens material, each of the semi-finished ophthalmic lenses in the set having an initially determined geometry including one of a plurality of base curves determined to allow manufacture of finished ophthalmic lenses for ophthalmic lens prescriptions, the method including:

electronically providing prescription data indicative of ophthalmic lens prescriptions of a plurality of ophthalmic lens wearers;

electronically determining a proportion of ones of the ophthalmic lens prescriptions that correspond to each one of the base curves of the semi-finished ophthalmic lenses in the set of semi-finished ophthalmic lenses;

electronically providing manufacturing data indicative of constraints affecting manufacture of the set of semi-finished ophthalmic lenses;

electronically determining one or more final geometries of the at least one semi-finished ophthalmic lens in the set by optimising the initially determined geometry of each of the semi-finished ophthalmic lenses in the set using the proportion of said ones of the ophthalmic lens prescriptions that correspond to each one of the base curves of the semi-finished ophthalmic lenses in the set and the constraints; and electronically outputting data indicative of the one or more final geometries.

Typically, optimising will advantageously include minimising costs subject to the manufacturing constraints. Thus, for instance, optimising includes minimising cost by minimising the use of lens material by optimising geometry of at least one semi-finished ophthalmic lens in the set of semi-finished ophthalmic lenses. Nonetheless, it will be appreciated that optimising can also include, for instance, minimising transportation and minimising waste and its impact on the environment.

Preferably, the optimising includes optimising the initially determined geometry of each of the semi-finished ophthalmic lenses in the set using an evolutionary algorithm, such as a genetic algorithm. It will be appreciated by a person skilled in the art that evolutionary algorithms are genetic population based optimisation algorithms that are based on aspects of biological evolution, such as reproduction, mutation, recombination, and/or selection, to find an optimal solution to a problem. It will also be appreciated that an evolutionary algorithm differs from other, say classical, optimisation algorithms in a number of ways due to these evolutionary aspects. Firstly, an evolutionary algorithm is a nondeterministic algorithm which can yield different solutions on different runs of the algorithm with the same variables due to a random sampling of the variables. Secondly, an evolutionary algorithm generates a population of candidate solutions rather just maintaining a single best solution found thus far. Thirdly, an evolutionary algorithm periodically makes random changes or mutations (e.g. based on DNA mutations in evolution) in members of the current population of candidate solutions to yield new candidate solutions. Fourthly, an evolutionary algorithm attempts to combine elements of existing candidate solutions to create new candidate solutions (e.g. based on sexual reproduction in evolution). Finally, an evolutionary algorithm performs a selection process in which the "most fit" members of the candidate solution population survive and the "least fit" members are eliminated (e.g. based on natural selection in evolution); in this case, the degree of "fitness" for survival can be designated based on, say, a level of satisfaction of the constraints applied to the algorithm.

Preferably, the method further includes determining a proportion of ones of the ophthalmic lens prescriptions that correspond to each one of the one or more final geometries of the at least one semi-finished ophthalmic lens in the set. That is, for each base curve lens in the set, the method determines one or more final geometries of lenses having that base curve and then determines a proportion of prescriptions that correspond to each of these final geometries. In an embodiment, the method then further iteratively optimises these final geometries using the proportion of prescriptions that correspond to each one of the final geometries of the at least one semi-finished ophthalmic lens in the set. That is, for each base curve, the method determines one or more final geometries of lenses having that base curve and then iteratively optimises these final geometries to derive optimised final geometries for each base curve. Thus, using the method, one or more of the lenses in the initial set of semi-finished ophthalmic lenses—each having a different base curve and an initial geometry—is optimised to derive one or more final geometries for each of these initial lenses. The derived final geometries of semi-finished ophthalmic lenses, when produced, will thus collectively reduce manufacturing costs associated with manufacturing finished ophthalmic lenses for substantially all ophthalmic lens prescriptions.

As described, genetic algorithms simulate aspects of genetic breeding found in nature and are particularly suited to solving optimising problems subject to external constraints such as manufacturing constraints. Such manufacturing constraints include volume of designated lens material of each of the semi-finished ophthalmic lenses in the set, as well as one or more of: a cost per different geometry of ones of the base curves of each of the semi-finished ophthalmic lenses in the set; a cost of the designated lens material; and a minimum thickness of the semi-finished ophthalmic lenses. Furthermore, there is a cost per different material; lens materials include plastics such as the allyl diglycol carbonate monomer known as CR-39®, thiourethanes such as MR-7™ and MR-8™, and polycarbonate. Other constraints include: lens centre thickness, lens edge thickness, lens diameter, lens back/front radius, lens front/back sagittal value, lens density, and spherical gap volume. It will be appreciated by those persons skilled in the art that spherical gap volume corresponds to volume of a semi-finished ophthalmic lens, which has front and back spherical surfaces enclosing a coaxial cylindrical container. It will also be appreciated that semi-finished ophthalmic lenses could have non-spherical surfaces and/or non-coaxial spherical centres with respect to the cylindrical container. In the case where the semi-finished lens has spherical surfaces, the volume of the lens is constructed by the spherical cap of the front surface (i.e. sphere sliced by a plane) plus the volume of the cylinder extending from the flat surface of the cap minus the volume of spherical cap of the back surface. The centres of the spheres for both the front and back surfaces are located on the cylinder's axis.

Furthermore, the data indicative of the constraints may include data indicative of upper bounds in addition to the above mentioned minimum values (i.e. lower bounds). That is, for example, the constraint data includes say both a minimum centre thickness of a semi-finished ophthalmic lens and a maximum centre thickness of the lens.

It will also be appreciated by those persons skilled in the art that the cost per different geometry of ones of the base curves includes, for instance, the cost of producing different dies to cast lenses with different geometries. In addition to the costs relating to manufacturability of the different geometries, there is also a cost in increased warehousing complexity (e.g. SKU proliferation). Also, as discussed, the semi-finished lenses are finished with further grinding and polishing and thus require a minimum centre thickness. In use, for example, distortions can occur during the "Freeform" process of manufacturing spectacle lenses (i.e. finishing a lens) if the lens thickness is too thin, where the "Freeform" process is a CNC technology used by the ophthalmic lens industry for cutting lenses; particularly, but not exclusively, when the lens is a progressive lens. In practice, for instance, through empirical testing for different lens materials, minimum thicknesses are determined as constraints for the optimising method. Also, in an embodiment, the above described cost per different geometry of ones of the base curves includes a cost per different diameter of ones of the base curves of each of the semi-finished ophthalmic lenses in the set and/or a cost per different back curve of each of the semi-finished ophthalmic lenses in the set.

Preferably, the prescription data includes data including sphere power and cylinder power for a lens. In addition, the prescription data can also include data such as addition power, prism power, frame shape and decentration data (e.g. Rx script data), as well as axis data. Axis data relates to data indicative of an angle of orientation of the prescribed cylindrical power for a lens. In an embodiment, the frame shape and decentration data is used to determine the manufacturing constraints of the minimum diameter and minimum thickness of semi-finished ophthalmic lenses. In addition, in another embodiment, the initial geometry and the one or more final geometries include a diameter and the method further includes optimising the initially determined diameter of each of the semi-finished ophthalmic lenses in the set using the frame shape and decentration data. Accordingly, the method advantageously optimises the geometry of the semi-finished ophthalmic lenses in the set which pertain to, say, certain more prevalent sphere and cylinder power lens prescriptions.

As described, each lens in the set of semi-finished lenses has an initial geometry that is large enough to produce the range of lenses for frame prescriptions determined for a particular base curve. The geometry of the lens, including both the initial and the final geometries, includes, in an embodiment, thickness (centre and edge), diameter, front curve radius, and back curve radius. The front and rear curve radii express the curvature of the front and the rear surfaces of a lens, usually in millimeters. The one or more optimised final geometries of lenses are therefore smaller in one or more of these parameters per base curve to minimise use of lens material, particularly for the more popular prescriptions. That is, preferably, the method optimises geometries of the more popular lenses in the set of lenses to reduce the volume of lens material used in those lenses and thus reduce the volume of material wasted by the Rx labs. It will be appreciated that a representative sample of Rx script data, large enough to be statistically significant is needed to obtain meaningful calculations. In an example, the prescription data is taken from a population of, say, 60,000 Rx scripts.

That is, in an example, the optimising method determines the minimum geometries for each Rx script and then determines the minimum lens geometry for each Rx script before adding the manufacturing constraints to the optimising step. The method then determines the final geometries of lenses in the set which are quantized into the required groupings, to minimise material usage.

For example, the method includes determining a portion of ones of the sphere power and cylinder power of the ophthalmic lens prescriptions that correspond to each one of the base curves of the semi-finished ophthalmic lenses. The method then optimises the initially determined geometry of each of the semi-finished ophthalmic lenses in the set using the portion of ones of the sphere power and cylinder power of the ophthalmic lens prescriptions that correspond to each one of the base curves. In another example, the method includes additionally (or in the alternative) determining a portion of ones of the addition power and prism power of the ophthalmic lens prescriptions that correspond to each one of the base curves of the semi-finished ophthalmic lenses, and optimises the initially determined geometry of each of the semi-finished ophthalmic lenses in the set using the portion of ones of the addition power and prism power of the ophthalmic lens prescriptions that correspond to each one of the base curves. Accordingly, for a semi-finished lens with an initial geometry in the set that covers many common prescriptions, the method determines the optimal geometry for that lens to have, say, two smaller geometries and one larger lens geometry. This combination of final geometries allows for all prescriptions to be manufactured by the Rx labs but with significantly less lens material being required.

The benefits of this include, for instance, material savings during manufacturing to lower cost, lower overall weights to lower transportation costs, and less waste material removal in the Rx Labs to minimise environmental waste. Thus, the optimised final geometries are sufficiently small enough to allow significant material savings and sufficiently large enough to allow a significant percentage of Rx scripts to be processed.

The present invention also provides a system for optimising geometry of at least one semi-finished ophthalmic lens in a set of semi-finished ophthalmic lenses having a designated lens material, each of the semi-finished ophthalmic lenses in the set having an initially determined geometry including one of a plurality of base curves determined to allow manufacture of finished ophthalmic lenses for ophthalmic lens prescriptions, the system including:

a providing module arranged to provide prescription data indicative of ophthalmic lens prescriptions of a plurality of ophthalmic lens wearers;

a processing module arranged to determine a proportion of ones of the ophthalmic lens prescriptions that correspond to each one of the base curves of the semi-finished ophthalmic lenses in the set of semi-finished ophthalmic lenses;

the providing module further arranged to provide manufacturing data indicative of constraints affecting manufacture of the set of semi-finished ophthalmic lenses;

the processing module further including an optimising module arranged to determine one or more final geometries of the at least one semi-finished ophthalmic lens in the set by optimising the initially determined geometry of each of the semi-finished ophthalmic lenses in the set using the proportion of said ones of the ophthalmic lens prescriptions that correspond to each one of the base curves of the semi-finished ophthalmic lenses in the set and the constraints; and an output module arranged to output data indicative of the one or more final geometries.

According to another aspect of the present invention, the present invention provides at least one semi-finished ophthalmic lens in a set of semi-finished ophthalmic lenses having a designated lens material having an optimised geometry including one or more final geometries determined by implementing the above method.

In another aspect, the present invention provides computer program code which when executed implements the above method, and also provides a tangible computer readable medium including the above computer program code. According to yet another aspect, the present invention provides a data signal including either the above program code or the data indicative of the one or more final geometries determined by execution of the above computer program code.

Specifically, the present invention provides computer program code usable to configure a server to implement method of optimising geometry of at least one semi-finished ophthalmic lens in a set of semi-finished ophthalmic lenses having a designated lens material, each of the semi-finished ophthalmic lenses in the set having an initially determined geometry including one of a plurality of base curves determined to allow manufacture of finished ophthalmic lenses for ophthalmic lens prescriptions, the server being configured to:

provide prescription data indicative of ophthalmic lens prescriptions of a plurality of ophthalmic lens wearers;

determine a proportion of ones of the ophthalmic lens prescriptions that correspond to each one of the base curves of the semi-finished ophthalmic lenses in the set of semi-finished ophthalmic lenses;

provide manufacturing data indicative of constraints affecting manufacture of the set of semi-finished ophthalmic lenses;

determine one or more final geometries of the at least one semi-finished ophthalmic lens in the set by optimising the initially determined geometry of each of the semi-finished ophthalmic lenses in the set using the proportion of said ones of the ophthalmic lens prescriptions that correspond to each one of the base curves of the semi-finished ophthalmic lenses in the set and the constraints; and output data indicative of the one or more final geometries.

The processing module is preferably further arranged to determine a proportion of ones of the ophthalmic lens prescriptions that correspond to each one of the one or more final geometries of the at least one semi-finished ophthalmic lens in the set. The optimising module is preferably further arranged to then iteratively optimise these final geometries of the at least one semi-finished ophthalmic lens in the set using the proportion of said ones of the ophthalmic lens prescriptions that correspond to each one of the one or more final geometries of the at least one semi-finished ophthalmic lens in the set.

As described, the prescription data may include sphere power and cylinder power and the processing module may be further arranged to determine a portion of ones of the sphere power and cylinder power of the ophthalmic lens prescriptions that correspond to each one of the base curves of the semi-finished ophthalmic lenses.

Further, the optimising module may be arranged to optimise the initially determined geometry of each of the semi-finished ophthalmic lenses in the set using the portion of ones of the sphere power and cylinder power of the ophthalmic lens prescriptions that correspond to each one of the base curves. Further still, the prescription data may include addition power and prism power and the processing module is further arranged to determine a portion of ones of the addition power and prism power of the ophthalmic lens prescriptions that correspond to each one of the base curves of the semi-finished ophthalmic lenses, and the optimising module is further arranged to optimise the initially determined geometry of each of the semi-finished ophthalmic lenses in the set using the portion of ones of the addition power and prism power of the ophthalmic lens prescriptions that correspond to each one of the base curves.

The initial geometry and the one or more final geometries may include a diameter and the optimising module may be further arranged to optimise the initially determined diameter of each of the semi-finished ophthalmic lenses in the set using frame shape and decentration data in the prescription data.

The constraints may include a volume of the designated lens material of the semi-finished ophthalmic lenses in the set and the optimising module may be further arranged to optimise the initially determined geometry of each of the semi-finished ophthalmic lenses in the set to minimise the volume of the designated lens material of the at least one semi-finished ophthalmic lens in the set.

BRIEF DESCRIPTION OF DRAWINGS

Embodiments of the invention will now be described, by way of example only, with reference to the accompanying drawings, in which:

FIG. 4 shows, by way of a further example, a prescription data distribution per base curve of semi-finished ophthalmic lenses in a set, as well as the lens material savings from the optimised final geometries, according to an embodiment of the present invention;

DETAILED DESCRIPTION

Figure 1:
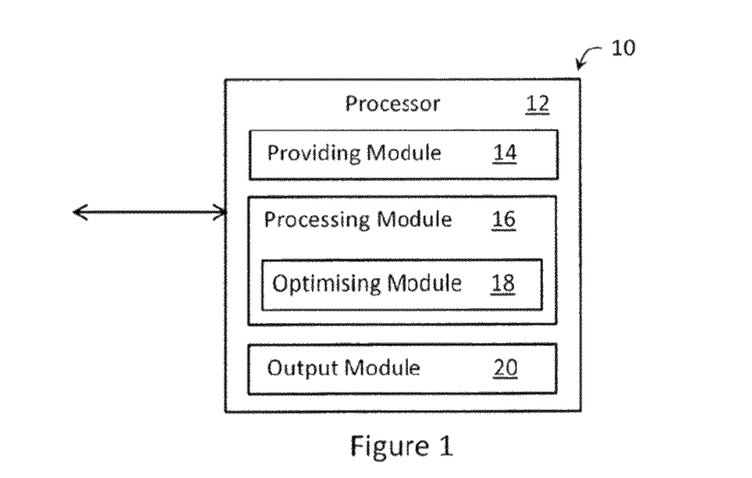
FIG. 1 is a schematic diagram of an embodiment of the present invention.

According to an embodiment, there is provided a system 10 for optimising geometry of at least one semi-finished ophthalmic lens in a set of semi-finished ophthalmic lenses having a designated lens material, as shown in FIG. 1. As described, each of the semi-finished ophthalmic lenses in the set has an initially determined geometry including one of a plurality of base curves determined to allow manufacture of finished ophthalmic lenses for substantially all ophthalmic lens prescriptions. It will be appreciated by those persons skilled in the art that the term "substantially all" when used herein with reference to ophthalmic lens prescriptions refers to a designated percentage of ophthalmic lens prescriptions suitable for an entire population having ophthalmic lens prescriptions. For example, "substantially all" ophthalmic lens prescriptions refers to approximately 99.99% of ophthalmic lens prescriptions suitable for the entire population of ophthalmic lens wearers. Thus, finished ophthalmic lenses for very rare ophthalmic lens prescriptions that are outside the scope of substantially all ophthalmic lens prescriptions (e.g. "specialty" lenses for some prescriptions that exist in less than approximately 0.01% of the population of lens wearers) are not manufactured from the above mentioned set of semi-finished ophthalmic lenses.

The system 10 includes a processor 12 for implementing a number of modules that implement the optimisation. The modules include a providing module 14 arranged to provide prescription data indicative of ophthalmic lens prescriptions of a plurality of ophthalmic lens wearers and a processing module 16 arranged to determine a proportion of ones of the ophthalmic lens prescriptions that correspond to each one of the base curves of the semi-finished ophthalmic lenses in the set of semi-finished ophthalmic lenses. The providing module 14 is further arranged to provide manufacturing data indicative of constraints affecting manufacture of the set of semi-finished ophthalmic lenses. In an embodiment, the providing module 14 receives prescription data and manufacturing data from servers in data communication with the processor 12. In any event, the processing module 16 further includes an optimising module 18 arranged to determine one or more final geometries of the at least one semi-finished ophthalmic lens in the set by optimising the geometry of a given set of potential semi-finished ophthalmic lenses such that overall volume of material required has been minimized and all input initially determined geometry of each of the semi-finished ophthalmic lenses fit within the optimized geometries of the potential semi-finished ophthalmic lenses, subject to all input constraints described herein as manufacturing constraints. Furthermore, the processor 12 includes an output module 20 arranged to output data indicative of the one or more final geometries.

In addition, the processing module 16 is further arranged to determine a proportion of ones of the ophthalmic lens prescriptions that correspond to each one of the one or more final geometries of the at least one semi-finished ophthalmic lens in the set. The optimising module 18 is then further arranged to iteratively optimise these final geometries of the at least one semi-finished ophthalmic lens in the set using the proportion of ophthalmic lens prescriptions that correspond to each one of the final geometries of the at least one semi-finished ophthalmic lens in the set. The optimising module 18 thus derives optimised final geometries and the output module 20 is arranged to output data indicative of the optimised final geometries.

Figure 2:
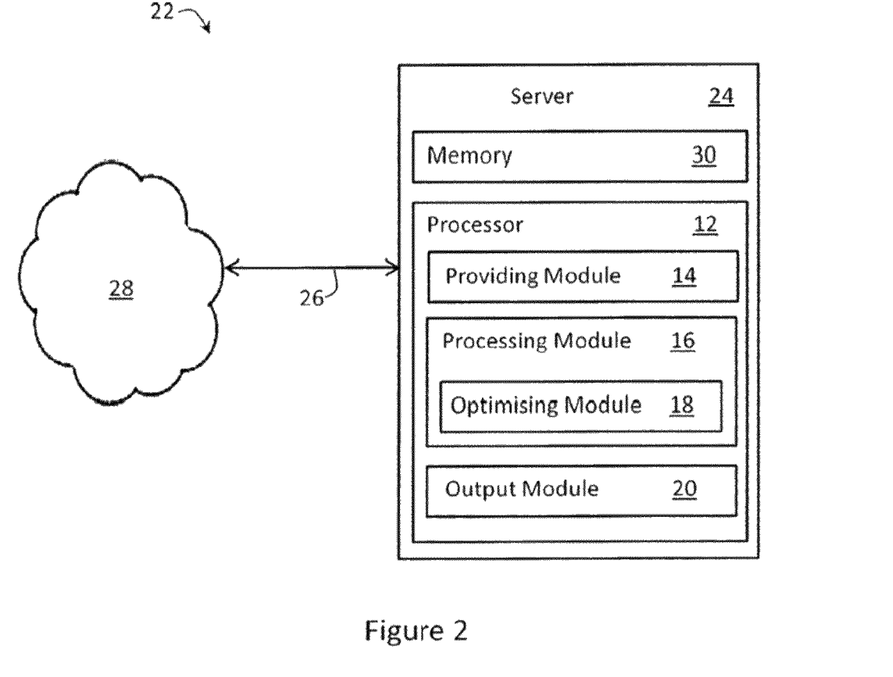
FIG. 2 is a further schematic diagram of an embodiment of the present invention.

In a further embodiment of a system 22 for optimising geometry of at least one semi-finished ophthalmic lens in a set shown in FIG. 2, the processor 12 resides on a server 24 accessible over a network 28, such as the Internet, by a suitable data link 26. Accordingly, the server 24 receives and transmits data over the network 28 with any number of connected computing devices (not shown). The server 24 also includes a memory 30, in addition to the processor 12, for storing instructions to implement the modules to perform the optimisation to generate data indicative of the one or more final geometries. Thus, in the embodiment, the providing module 14 on the server 24 receives (or even may have stored) prescription data indicative of ophthalmic lens prescriptions of a plurality of ophthalmic lens wearers from, say, another server connected to the network 28 and manufacturing data indicative of constraints affecting manufacture of the set of semi-finished ophthalmic lenses from, say, a lens designer's computing device connected to the network 28. Furthermore, the modules on the server 24 perform the optimisation to generate data indicative of the one or more final geometries and this data is outputted to, say, the lens designer's computing device connected to the network 28. In this embodiment, the system 22 optimises geometries of semi-finished ophthalmic lenses in a set to produce a new set of semi-finished ophthalmic lenses having geometries that still allow manufacture of substantially all ophthalmic lens prescriptions but with less lens material being wasted by the above mentioned Rx labs.

Thus, in use, for example, the lens designer's computing device collates or obtains prescription data indicative of ophthalmic lens prescriptions from a plurality of ophthalmic lens wearers. In an embodiment, the lens designer's computing device collates a large population of Rx script data from a number of different Rx labs over time, which, in turn, receives prescription data from a number of different optometrists and ophthalmologists, for distribution analyses to be performed. As described, the prescriptions are determined by an optometrist or an ophthalmologist to correct anomalies in a lens wearer's sight and include sphere power and cylinder power information. It will therefore be appreciated that the population of Rx script data for analysis can be global or localised (e.g. the population data may be limited to Caucasian lens wearers) to produce an optimised set of semi-finished ophthalmic lenses for the desired population.

Figure 3:
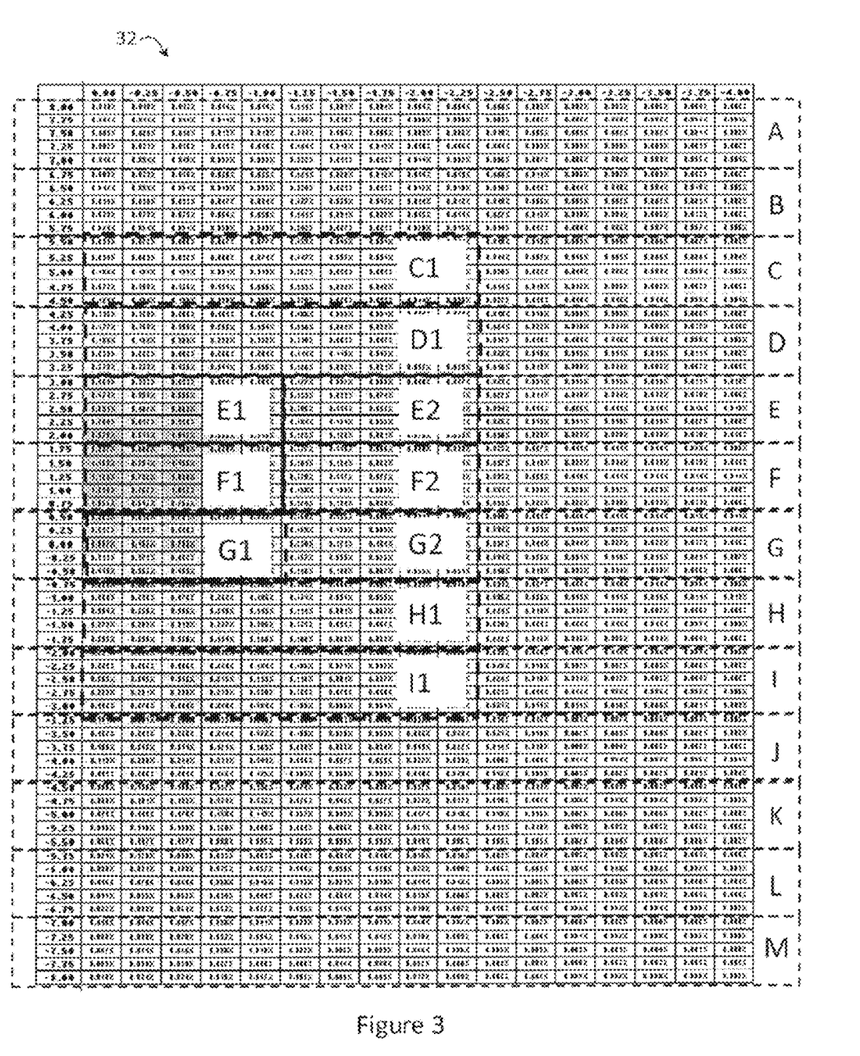
FIG. 3 shows, by way of example, a prescription data distribution per base curve of semi-finished ophthalmic lenses in a set according to an embodiment of the present invention.

FIG. 3 shows an example of a collation of prescription data for a given population with sphere power on the x axis and cylinder power on the y axis. Here, it is shown, by the darker shaded regions, that there is a higher concentration of the population having prescriptions with low sphere and cylinder power than high sphere and cylinder power. Indeed, the darker shaded region around a prescription of, say, sphere 0.00 and cylinder 1.00 is more popular by the order of approximately 1000:1 over a prescription of, say, sphere 8.00 and cylinder −4.00. It is also shown in FIG. 3 that a set of semi-finished ophthalmic lenses for a designated lens material (e.g. with a refractive index of 1.6 or 1.67) with different base curves practically covers the whole range of lens prescriptions. That is, the set of semi-finished lenses has an initially determined geometry for each lens including a number of different base curves to cover the range. A person skilled in the art will recognise that the base curve delineations A through M, including I1 through I1 and E2 through G2 are purely for explanatory purposes and do not necessarily represent the actual delineations. Delineations may, for example, be based on additional parameters such as addition power, prism power, decentration and diameter requirements.

As described, semi-finished ophthalmic lenses used in "Freeform" production are commonly referred in the art as "pucks". Accordingly, the term "semi-finished ophthalmic lens" will hereinafter be referred to as simply a puck in the specification. It will be appreciated by those persons skilled in the art that the term "puck" encompasses the same scope of front surface design (e.g. spherical, aspherical and progressive) as the term "semi-finished ophthalmic lens".

In the example shown in FIG. 3, there are 13 different determined base curves of pucks A-M in the set of pucks which are determined to substantially cover all prescriptions. These base curves can be determined using existing base curve selection charts and, in the example, the base curves are determined at approximately 1 Dioptre intervals in sphere power. It will be appreciated by those persons skilled in the art that there may be prescriptions requiring higher power than, say, sphere 8.00 and cylinder −4.00, but these prescriptions are very rare and are not intended to be covered by the set of pucks. These rare prescriptions would be made using very large, special purpose pucks, made in very small quantities, which are not significant for the optimised puck approach.

In use, the designer, wishing to optimise the geometries of lenses in the set of pucks A-M, uses his computing device to make available the collated prescription data to the server 24. The providing module 14 of the server 24 receives the data and the processing module 12 of the server 24 determines a proportion of lens prescriptions that correspond to each of the pucks A-M in the set. It will be appreciated by those persons skilled in the art that this step can also be performed at, say, the server hosting the collated prescription data. In any event, the proportion of lens prescriptions is shown by the shading in FIG. 3 where, for instance, pucks E, F and G have significantly more Rx scripts than pucks with other base curves.

The designer, using his computing device, also provides manufacturing data indicative of selected constraints affecting manufacture of the set of pucks. That is, the designer identifies and determines, using his computing device, the desired practical manufacturing constraints including a number of pucks per base curve. That is, this constraint relates to a cost and convenience of manufacturing a different geometry of pucks per base curve. It will be appreciated that, without this constraint, the optimising step would determine a large number of final puck geometries for each base curve to maximize lens material savings. Accordingly, the number of pucks per base curve is constrained to enforce a practical balance between the number of different final puck geometries (e.g. number of different SKU's to manufacture) and the material savings achieved. As shown in FIG. 3, some base curves have very low populations of Rx scripts (e.g. very high Rx scripts); hence multiple pucks, whilst showing some possible savings, are impractical due to increased manufacturing costs and complexity. More than one final geometry of puck per base curve is determined for base curves with significant Rx script percentages; thus allowing material savings to be achieved. In use, for example, the designer selects a maximum number of different geometries of pucks per base curve to be manufactured to be three. In addition, the designer selects a single geometry for pucks having a base curve with very low populations of Rx scripts (e.g. base curve A) to be manufactured, as multiple pucks are impractical due to manufacturing costs and complexity; thus material savings are not cost effective, but nevertheless, are not prohibited.

The designer also determines, using his computing device, a minimum thickness of puck per base curve to allow manufacture of a finished ophthalmic lens from the puck by the Rx lab without distortion. In particular, the designer determines, using his computing device, the minimum centre thickness per base curve of puck required to avoid flexing during the subsequent Rx processing step. It will be appreciated that, without this constraint, the optimising step can result in solutions with overly low centre thickness values that can introduce distortion in the subsequent finishing step. That is, while indicating significant material savings, practical Rx processing in an Rx lab of such thin pucks will result in distorted or out-of-tolerance lenses due to, for example, the flexing characteristic of a thin puck.

Furthermore, in another embodiment, the cost per different geometry for each base curve includes a cost per different diameter of puck per base curve. This manufacturing constraint is determined by the designer, using his computing device, from the collated prescription data, including frame data for the lens wearers in the population. Also, in another embodiment, the prescription data includes decentration data. For example, the prescription data includes frame shape information (e.g. frame shape for a wraparound lens), customer specified diameters of lenses and Rx lab specified diameters for "handling" of the lenses during practical Rx processing steps. It will be appreciated by those persons skilled in the art that the frame shape information includes information regarding the shape of the finished lenses which are to be fitted to the frame, and the "handling" of the lenses includes the steps of, for instance, grinding and polishing the semi-finished lenses during the Rx process. Also, the decentration data includes information as to where the optical centre of the finished lens is relative to the geometric centre of the puck following the Rx processing steps. It will be appreciated that, without this constraint, the optimising step can result in solutions with a large range of different diameter requirements allowing significant material savings but adding undue manufacturing costs. Accordingly, the designer, using his computing device, quantizes the number of different diameter selections to a smaller number of different diameters; thus providing a practical manufacturing solution whilst retaining the majority of material savings. For example, the designer selects, using his computing device, a maximum number of different diameters of pucks per base curve to be two. Furthermore, it will be appreciated by those persons skilled in the art that while different thickness pucks can be cast using the same die (and moulds and gaskets) different dies are required for different diameter pucks. Accordingly, the manufacturing cost is higher to produce different diameter pucks than to produce pucks with different thickness. Conversely, if the manufacturing method used does not have this constraint, then the diameter parameter is freer to vary, per the optimized calculations.

In addition, the cost per different geometry for each base curve includes a cost per different back curve of puck per base curve. The back curve is the eye side curve that is "finished" by the Rx lab to produce a finished lens. It will be appreciated that, without this constraint, the optimising step can result in solutions with a very wide range of back curve requirements, due to the complexity and variants of the final lens form (as worn). However, from a practical puck manufacturing perspective, a limited number of back curve solutions should be selected by the designer, using his computing device, for the optimized puck geometry solutions. In an embodiment, the set of pucks have spherical back curves as this is the present industry norm. It is envisaged, however, that other back curves can be used such as those with a cylindrical component.

In use, the designer, wishing to optimise the geometries of pucks in the set of pucks A-M shown in FIG. 3, inputs, using his computing device, the manufacturing data indicative of the above constraints into the server 24. For example, the lens designer inputs the determined constraints from his/her computing device that is connected to the network 28. The providing module 14 of the server 24 receives the data and the optimising module 18 of the server 24 determines one or more final geometries for each of the pucks A-M in the set by performing the optimising step. Specifically, the optimising module 18 performs the optimising step by optimising the initially determined geometries per base curve of pucks in the set using the prescription population data per base curve and the manufacturing data in an optimising algorithm. In an embodiment, the algorithm is a "Solver" algorithm which identifies iteratively the optimum puck geometries per base curve using the population data and constraints listed above. It will be appreciated by those persons skilled in the art that a "Solver" algorithm is an algorithm that is used to solve linear and non-linear optimisation problems, An example of a "Solver" algorithm is a Microsoft Office Excel™ Solver tool provided by Frontline Solvers™. This Solver tool uses an evolutionary solving method including an evolutionary algorithm of the type described above to obtain optimal solutions.

As described, the objective of the optimising algorithm is to minimize the total volume of lens material used to provide a set of pucks that substantially cover all prescriptions such that the limiting geometries are satisfied by the puck with the lowest overall material use within the available pucks. A large penalty is introduced for solutions of the algorithm which do not service a prescription's limiting geometry such that the final solution will satisfy all input geometries. A small penalty is introduced to create an order from lowest to highest volume in the pucks so that the selection logic will choose the lowest volume which fits the limiting geometries. It will be appreciated by those persons skilled in the art that the small and large penalties correspond to small and larger measures of violation of the constraints to discount those solutions that grossly violate the constraints. In an example, the difference between the smallest and the largest penalty in the algorithm is in the order of 10000. Thus, for instance, a solution with a puck diameter greatly outside the designated upper and lower bounds of say the puck diameter constraint is applied a penalty of 10000 to reduce its chances of being considered as a viable solution. Also, since the objective function of the optimising algorithm is non-linear, has discontinuous derivatives, and involves a mix of integer and floating point variables, a genetic algorithm solver was selected in the embodiment to find optimum solutions.

Generally, in a genetic algorithm, the variable values in each solution identified in the optimising step are digitized as a series of bits in a way that the bit series represents the range of values specified in the input constraints. These solutions are referred to as individuals. A collection of individuals is used to represent a variety of possible solutions to the problem. The population is initialized with the then current best input solution and a randomly generated set of individuals with variable values within the limits specified. Each solution is tested against the objective function. Two modifications are then made to the population. Random pairs of individuals are selected, and a random point in the bit series is selected. Bits after the selected bit position are swapped in an operation called cross-over. This results in a new individual. Subsequently, a random number is selected and if it meets the specified threshold parameter, a random bit in the individual is changed in an operation called mutation. The checking against the objective function is then performed again for the resulting new population, eliminating the lowest performing individuals, such that the population is at the specified size. The process repeats until either a time limit occurs or all individuals have sufficiently similar objective values. In the present case, the process repeats for different proposed geometries of pucks until reaching one or more final geometries for each puck in the set of pucks.

In reference to FIG. 3, the optimising algorithm determined that pucks with base curves E, F and G, should have final geometries E, E1& E2, F, F1& F2, G, G1 & G2, respectively, to minimise use of materials subject to the above mentioned manufacturing constraints. That is, for each of the three most popular base curves in the set of pucks, three different geometries are to be produced in the optimised set of pucks so that less material is wasted by the Rx labs producing the finished lenses from these pucks. Also, the optimising algorithm determined that pucks with base curves C, D, H, and I should have final geometries C & C1, D & D1, H & H1, and I & I1. That is, for each of the next four most popular base curves in the set, two different geometries are to be produced in the set of pucks. Accordingly, in this example, the output module 20 outputs to the designer data indicative of the determined final geometries for subsequent manufacture by a lens supplier. That is, the output module 20 outputs to the designer data indicative of pucks A, B, C & C1, D & D1, E, E1& E2, F, F1& F2, G, G1 & G2, H & H1, I & I1, J, K, L, and M to form the set of pucks with optimised geometries. It will be appreciated that the final geometries in the set retain the initial geometry for C-I as well as the optimised geometries so that the rarer prescriptions can still be manufactured from these pucks. Accordingly, in this example, the optimising step determined that there are optimally 23 final geometries of pucks in the set.

FIG. 4 shows another example of a set of pucks having their final geometries determined by the optimising algorithm. In the example, there is shown a graph 34 of the final geometries of the set of pucks according to the volume of materials saved. The set of pucks also has 13 base curves (050, 130, 190, 240, 340, 460, 560, 690, 790, 850, 950 and 1080 as shown in the leftmost column of FIG. 4) and the percentage of usage for each of the base curves is shown. For the more popular base curves, the Rx labs can select from three optimised geometries per base curve. For the not quite as popular, there are two optimised geometries per base curve, and for the least popular base curves, there is only a single final geometry per base curve to produce the desired "finished" lenses. For example, for the most popular base curve 340, with 22% of the population, the optimising algorithm achieves a 35% reduction in material used and thus wasted. Indeed, the overall material saving by optimising the geometry of all the pucks in the set in this example is 35.1%.

It can also be seen in FIG. 4, that the optimised final geometries of pucks can have different thicknesses, diameters, front curve radii, and/or back curve radii for each base curve. For example, the optimised final geometries of the puck with base curve 130 are two geometries having the same diameter of 73 mm, but with different thickness and different back curve radii (and back curve power). In this case, the optimising module 18 determined that a thicker puck with a centre thickness of 10.1 mm is required only 3.3% of the time such a puck is required to produce a "finished" lens. Accordingly, an optimised, thinner puck having a centre thickness of 5.4 mm can be deployed for use by the Rx labs so that there is a lens material savings of 28.5%. In another example, the optimised final geometries of the puck with base curve 950 are two geometries having different diameters of 69 and 73 mm, as well as different thicknesses and different back curve radii (and back curve power). For this puck, the optimising module 18 determined that the larger diameter puck was required only 23.5% of the time and thus a material saving of 30.1% could be implemented. It can also be seen that for rare Rx scripts (e.g. 1% and 2% of global usage) produced from a base curve, the optimising module 18 determines that any material savings made by introducing a smaller puck is not financially beneficial compared to the cost of manufacture. Accordingly, only one large puck is determined with a base curve of 050 and 1080 in the example shown in FIG. 4.

Furthermore, it can be seen from the example shown in FIG. 4 that there are 32 final geometries of pucks determined to be in the set of pucks and, as such, a 35.1% material saving is achieved. In another example using a set of pucks having a designated lens material with a refractive index of 1.6, there is a 45.7% material saving after the optimising algorithm is applied to this set of pucks. It will be appreciated by someone skilled in the art that varying any of the input parameters of the method (for example the manufacturing constraints) will result in a different output set of optimized pucks, with different percentage usages and savings.

Figure 5:
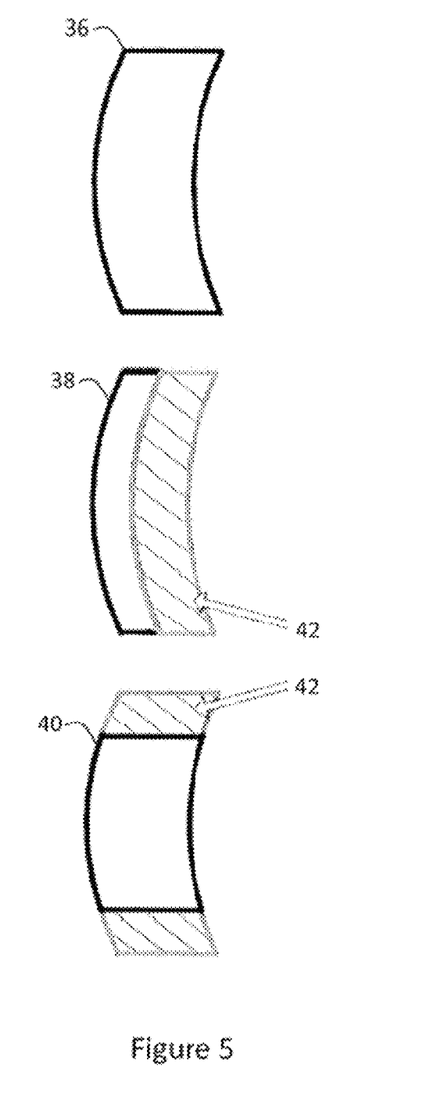
FIG. 5 shows different geometries for semi-finished ophthalmic lenses according to embodiments of the present invention.

An initial geometry of a puck 36 in a set of pucks is shown in FIG. 5. Here, it can be seen that a material savings from the initial geometry of the puck 36 can be made by reducing the thickness of an optimised puck 38 or reducing the diameter of another optimised puck 40. That is, by implementing the above optimising step, optimised pucks 38 and 40 have less material, as shown by the shaded region 42 in the figure. Additionally, both parameters of thickness and diameter can be adjusted at the same time.

Figure 6:
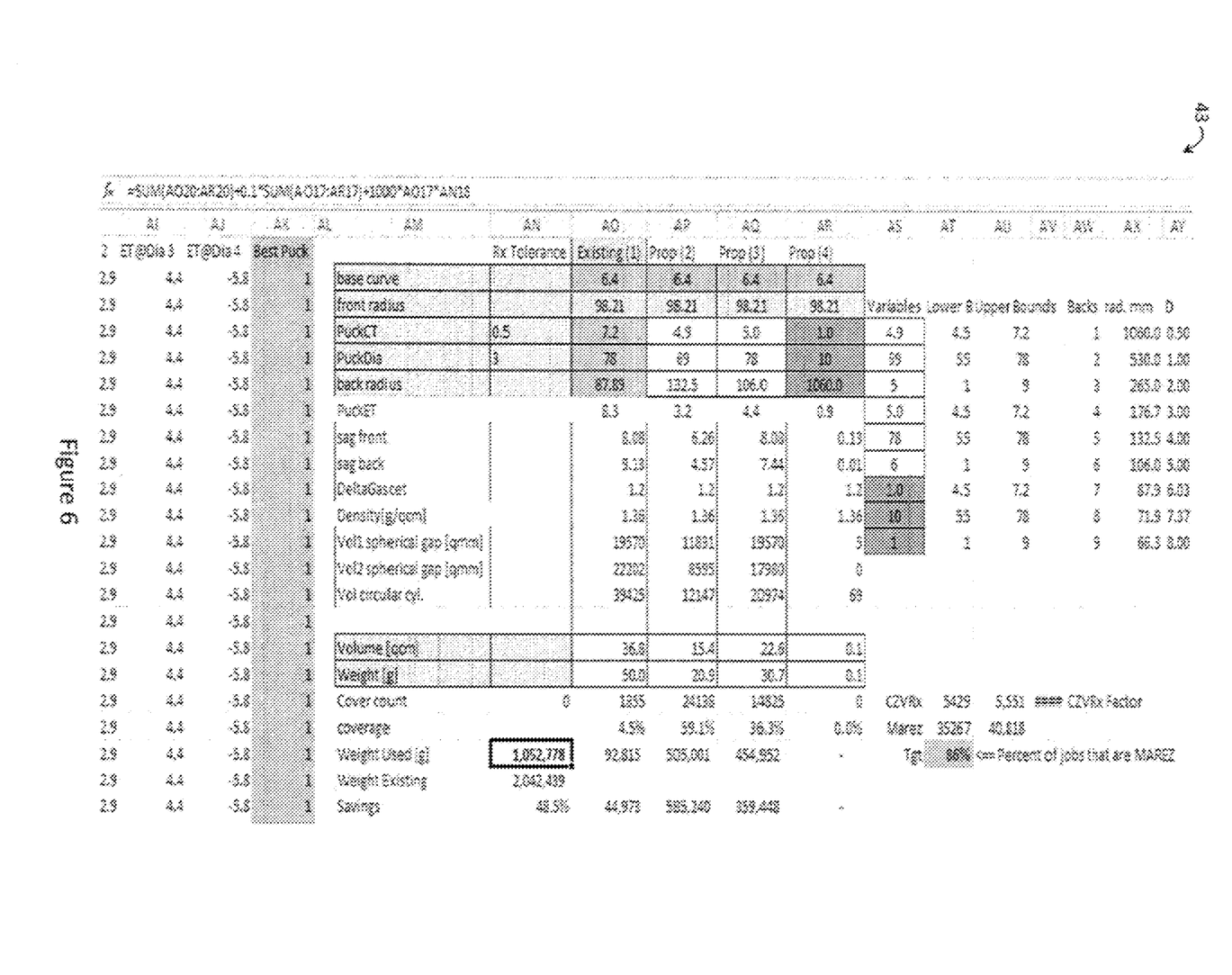
FIG. 6 shows an example of a calculation of geometries of semi-finished ophthalmic lenses according to an embodiment of the present invention.

In an example described above, the optimising step is performed with a "Solver" algorithm, which is a Microsoft Office Excel™ Solver tool provided by Frontline Solvers™. FIG. 6 shows a screenshot 43 of an example of optimised puck geometry calculations obtained using this "Solver" algorithm. Specifically, the "Solver" algorithm was used to determine the final geometries of a puck with the base curve of 6.4 (e.g. 640 in FIG. 4) within a set of pucks. Here, it can be seen that the objective of the algorithm is to minimise the weight used by the determined final geometries for the 6.4 base curve puck. In this case, the existing puck in the set of pucks has a 50 g. Also, the weight of all the existing 6.4 base curve pucks deployed for use by the Rx labs over a given period of time amounted to 2,042,439 g. By applying the algorithm, the weight of the final optimised geometry 6.4 base curve pucks deployed for use by the Rx labs over the same period of time will be 1,052,778 g—a weight savings of 48.5%. Accordingly, the algorithm determined that, based on the amount of proportion of prescriptions that use the 6.4 base curve puck, it was worthwhile optimising the geometry of this puck.

More specifically, FIG. 6 shows the geometry of the initial existing 6.4 base curve puck (Existing (1)) and three proposed final geometries of pucks for this 6.4 base curve puck (Prop (2); Prop (3); Prop (4)). The existing puck has geometry characteristics, such as a front radius, back radius, etc., which are initially determined and listed in column AO. The "solver" algorithm for optimising the geometry of a puck is applied and the geometry characteristics of the proposed final pucks are determined and listed in columns AP to AR of the figure. Also listed in columns AT and AU are the upper and lower bounds forming the constraints for determining these final geometries. Here, the constraints are upper and lower bounds for: puck centre thickness ("PuckCT"), puck diameter ("PuckDia"), back radius, puck edge thickness ("PuckET"), sagittal front/back value ("sag front"/"sag back"), "DeltaGascet", density, and "Vol1 spherical gap". Thus, for instance, the final puck diameter for the final geometries of the optimised 6.4 base curve puck is shown as being constrained between 55 and 78; thus the proposed puck Prop(4), with a puck diameter of 10, failed to fall within this constraint and will not ultimately form part of the final geometries of pucks for the 6.4 base curve puck. That is, for the 6.4 base curve puck, the algorithm determined that its final geometries will include the Prop(2) and Prop(3) geometries, in addition to the Existing (1) geometry, using the listed constraints. The algorithm also determined that 4.5% of prescriptions will require the Existing(1) puck, 59.1% will be able to use the Prop(2) puck, and 36.3% will be able to use the Prop (3) puck. Thus, following optimising, 95.4% of all prescriptions for the 6.4 base curve puck will now be able to use a reduced weight puck.

Figure 7:
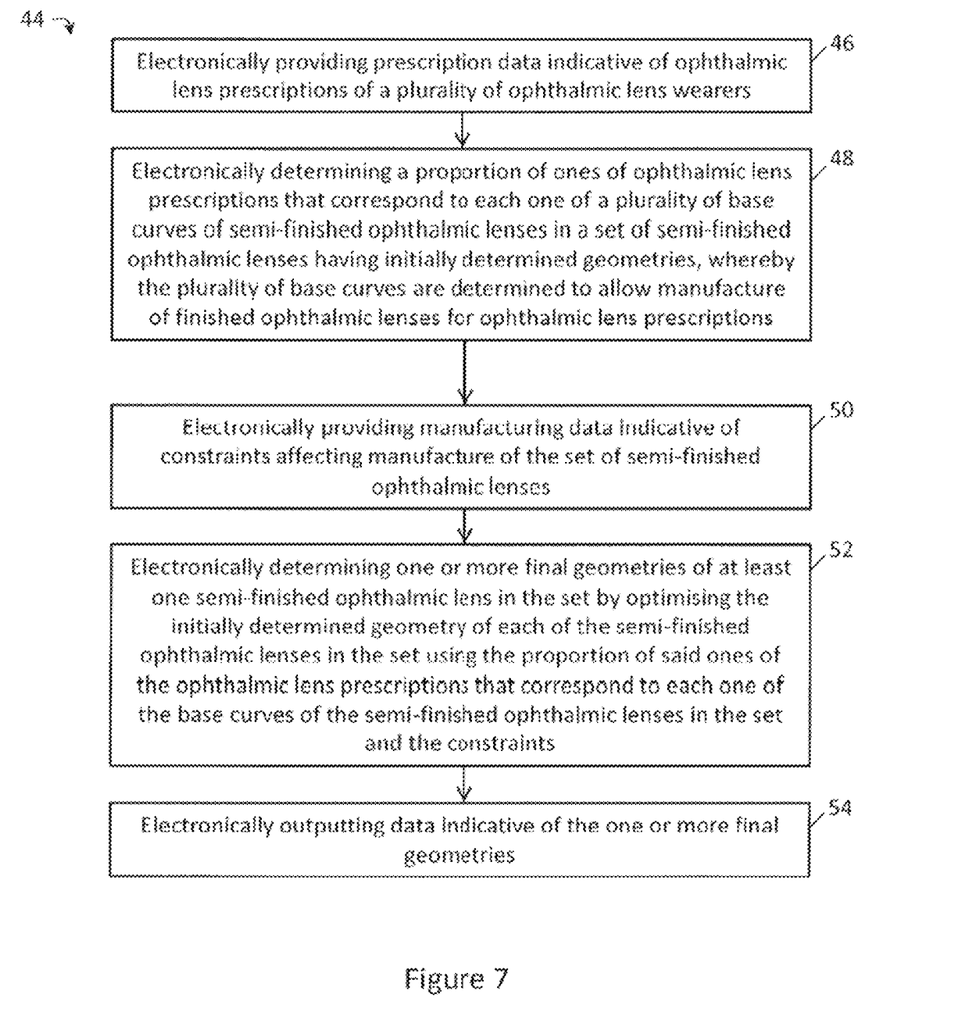
FIG. 7 is a flow diagram of an embodiment of the present invention.

Turning now to FIG. 7, there is shown a summary of a method 44 of optimising geometry of at least one semi-finished ophthalmic lens in a set of semi-finished ophthalmic lenses having a designated lens material. The method 44 including electronically providing 46 prescription data indicative of ophthalmic lens prescriptions of a plurality of ophthalmic lens wearers, electronically determining 48 a proportion of ones of ophthalmic lens prescriptions that correspond to each one of a plurality of base curves of semi-finished ophthalmic lenses in a set of semi-finished ophthalmic lenses having initially determined geometries, whereby the plurality of base curves are determined to allow manufacture of finished ophthalmic lenses for substantially all ophthalmic lens prescriptions, electronically providing 50 manufacturing data indicative of constraints affecting manufacture of the set of semi-finished ophthalmic lenses, electronically determining 52 one or more final geometries of at least one semi-finished ophthalmic lens in the set by optimising the initially determined geometry of each of the semi-finished ophthalmic lenses in the set using the proportion of said ones of the ophthalmic lens prescriptions that correspond to each one of the base curves of the semi-finished ophthalmic lenses in the set and the constraints, and electronically outputting 54 data indicative of the one or more final geometries.

Further aspects of the method will be apparent from the above description of the system 10. Persons skilled in the art will appreciate that the method could be embodied in program code, executed by a processor, which could be supplied in a number of ways, for example on a computer readable medium, such as a disc or a memory, or as a data signal, such as by transmitting it from a server.

Also, persons skilled in the art will appreciate that each semi-finished ophthalmic lens in the set of semi-finished ophthalmic lenses is manufactured from the designated lens material (e.g. with a refractive index of 1.6) using ophthalmic lens manufacturing techniques, with their final, optimised geometries determined by implementing the above described method.

Finally, it will be understood that there may be other variation and modifications to the configurations described here that are also within the scope of the present invention.

The invention claimed is:

1. A method of optimising geometry of at least one semi-finished ophthalmic lens in a set of semi-finished ophthalmic lenses having a designated lens material, each of the semi-finished ophthalmic lenses in the set having an initially determined geometry including one of a plurality of base curves determined to allow manufacture of finished ophthalmic lenses for ophthalmic lens prescriptions, the method comprising:
  electronically providing prescription data indicative of ophthalmic lens prescriptions of a plurality of ophthalmic lens wearers;
  electronically determining a proportion of ones of the ophthalmic lens prescriptions that correspond to each one of the base curves of the semi-finished ophthalmic lenses in the set of semi-finished ophthalmic lenses;
  electronically providing manufacturing data indicative of constraints affecting manufacture of the set of semi-finished ophthalmic lenses;
  electronically determining one or more final geometries of the at least one semi-finished ophthalmic lens in the set by optimising the initially determined geometry of each of the semi-finished ophthalmic lenses in the set using the proportion of said ones of the ophthalmic lens prescriptions that correspond to each one of the base curves of the semi-finished ophthalmic lenses in the set and the constraints, such that overall volume of material required for the semi-finished ophthalmic lenses in the set has been minimized; and
  electronically outputting data indicative of the one or more final geometries.

2. A method as claimed in claim 1, further including determining a proportion of ones of the ophthalmic lens prescriptions that correspond to each one of the one or more final geometries of the at least one semi-finished ophthalmic lens in the set.

3. A method as claimed in claim 2, further including iteratively optimising the one or more final geometries of the at least one semi-finished ophthalmic lens in the set using the proportion of said ones of the ophthalmic lens prescriptions that correspond to each one of the one or more final geometries of the at least one semi-finished ophthalmic lens in the set.

4. A method as claimed in claim 1, wherein the prescription data includes one or more of: frame shape, decentration, sphere power, cylinder power, addition power, prism power data, and axis data.

5. A method as claimed in claim 4, further including determining a portion of ones of the sphere power and cylinder power of the ophthalmic lens prescriptions that correspond to each one of the base curves of the semi-finished ophthalmic lenses.

6. A method as claimed in claim 1, wherein the initial geometry and the one or more final geometries include at least one of a thickness, diameter, front curve radius, and back curve radius.

7. A method as claimed in claim 1, further including optimising the initially determined geometry of each of the semi-finished ophthalmic lenses in the set to minimise a volume of said designated lens material of the at least one semi-finished ophthalmic lens in the set.

8. A method as claimed in claim 1, wherein the constraints include one or more of: a cost per different geometry of ones of the base curves of each of the semi-finished ophthalmic lenses in the set; a cost of the designated lens material; and a minimum thickness of the semi-finished ophthalmic lenses.

9. A method as claimed in claim 8, wherein the cost per different geometry of ones of the base curves includes a cost per different diameter of ones of the base curves of each of the semi-finished ophthalmic lenses in the set and/or a cost per different back curve of each of the semi-finished ophthalmic lenses in the set.

10. A system for optimising geometry of at least one semi-finished ophthalmic lens in a set of semi-finished ophthalmic lenses having a designated lens material, each of the semi-finished ophthalmic lenses in the set having an initially determined geometry including one of a plurality of base curves determined to allow manufacture of finished ophthalmic lenses for ophthalmic lens prescriptions, the system comprising:

a providing module arranged to provide prescription data indicative of ophthalmic lens prescriptions of a plurality of ophthalmic lens wearers;

a processing module arranged to determine a proportion of ones of the ophthalmic lens prescriptions that correspond to each one of the base curves of the semi-finished ophthalmic lenses in the set of semi-finished ophthalmic lenses;

the providing module further arranged to provide manufacturing data indicative of constraints affecting manufacture of the set of semi-finished ophthalmic lenses;

the processing module further including an optimising module arranged to determine one or more final geometries of the at least one semi-finished ophthalmic lens in the set by optimising the initially determined geometry of each of the semi-finished ophthalmic lenses in the set using the proportion of said ones of the ophthalmic lens prescriptions that correspond to each one of the base curves of the semi-finished ophthalmic lenses in the set and the constraints, such that overall volume of material required for the semi-finished ophthalmic lenses in the set has been minimized; and an output module arranged to output data indicative of the one or more final geometries.

11. At least one semi-finished ophthalmic lens in a set of semi-finished ophthalmic lenses having a designated lens material having an optimised geometry including one or more final geometries determined by implementing the method of claim 1.

12. Computer program code usable to configure a server to implement a method of optimising geometry of at least one semi-finished ophthalmic lens in a set of semi-finished ophthalmic lenses having a designated lens material, each of the semi-finished ophthalmic lenses in the set having an initially determined geometry including one of a plurality of base curves determined to allow manufacture of finished ophthalmic lenses for ophthalmic lens prescriptions, the server being configured by the computer program code to provide functions comprising:

provide prescription data indicative of ophthalmic lens prescriptions of a plurality of ophthalmic lens wearers;

determine a proportion of ones of the ophthalmic lens prescriptions that correspond to each one of the base curves of the semi-finished ophthalmic lenses in the set of semi-finished ophthalmic lenses;

provide manufacturing data indicative of constraints affecting manufacture of the set of semi-finished ophthalmic lenses;

determine one or more final geometries of the at least one semi-finished ophthalmic lens in the set by optimising the initially determined geometry of each of the semi-finished ophthalmic lenses in the set using the proportion of said ones of the ophthalmic lens prescriptions that correspond to each one of the base curves of the semi-finished ophthalmic lenses in the set and the constraints, such that overall volume of material required for the semi-finished ophthalmic lenses in the set has been minimized; and output data indicative of the one or more final geometries.

13. Computer program code which when executed implements the method of claim 1.

14. A tangible computer readable medium including the computer program code of claim 12.

15. A data signal including either the program code of claim 12 or the data indicative of the one or more final geometries determined by execution of the computer program code of claim 12.

* * * * *